(12) United States Patent
Akita et al.

(10) Patent No.: US 8,270,123 B2
(45) Date of Patent: Sep. 18, 2012

(54) VERTICAL-CURRENT-TYPE REPRODUCING MAGNETIC HEAD AND METHOD OF MANUFACTURING THE SAME

(75) Inventors: Kenichi Akita, Kanagawa (JP); Nobuo Yoshida, Kanagawa (JP); Katsuro Watanabe, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 288 days.

(21) Appl. No.: 12/615,222

(22) Filed: Nov. 9, 2009

(65) Prior Publication Data
US 2010/0123977 A1 May 20, 2010

(30) Foreign Application Priority Data
Nov. 20, 2008 (JP) ................................ 2008-297123

(51) Int. Cl.
*G11B 5/33* (2006.01)
(52) U.S. Cl. ...................................... 360/319
(58) Field of Classification Search .................. 360/319, 360/324.1, 324.11, 324.12, 324.2
See application file for complete search history.

(56) References Cited

U.S. PATENT DOCUMENTS

| | | | | |
|---|---|---|---|---|
| 6,831,817 B2* | 12/2004 | Hasegawa et al. | ....... | 360/324.12 |
| 7,869,166 B2* | 1/2011 | Miyauchi et al. | ....... | 360/324.11 |
| 2002/0157238 A1 | 10/2002 | Shimazawa et al. | | |
| 2003/0076635 A1 | 4/2003 | Morinaga et al. | | |
| 2003/0086216 A1 | 5/2003 | Kagami et al. | | |
| 2004/0080873 A1* | 4/2004 | Shintani et al. | ............ | 360/324.1 |
| 2006/0291097 A1 | 12/2006 | Honda et al. | | |
| 2007/0030603 A1* | 2/2007 | Sato et al. | ..................... | 360/324 |
| 2008/0008909 A1 | 1/2008 | Fuji et al. | | |

FOREIGN PATENT DOCUMENTS

| | | |
|---|---|---|
| JP | 2003-204096 | 7/2003 |
| JP | 2008097700 | 4/2008 |

* cited by examiner

*Primary Examiner* — Angel A. Castro
(74) *Attorney, Agent, or Firm* — Zilka-Kotab, PC

(57) ABSTRACT

In one embodiment, a vertical-current-type reproducing magnetic head includes a sensor film, an upper shield paired with a lower shield that together flow a current into the sensor film in a thickness direction of the sensor film, and magnetic-domain control magnetic films provided above both sides of the sensor film in a track width direction of the sensor film. The shield is formed via a nonmagnetic adhesion layer including a discontinuous region near the sensor film, and the sensor film contacts the upper shield. In another embodiment, a method includes forming a resist layer, etching a sensor film while using the resist layer as a mask, forming first insulating films, domain-control magnetic films, and nonmagnetic adhesion layers in a stacked manner, lifting-off the resist layer, and forming an upper shield that together with a lower shield flow current into the sensor film in a thickness direction of the sensor film.

15 Claims, 10 Drawing Sheets

VERTICAL-CURRENT-TYPE REPRODUCING MAGNETIC HEAD AND METHOD OF MANUFACTURING THE SAME

RELATED APPLICATIONS

The present application claims priority to a Japanese Patent Application filed Nov. 20, 2008, under Appl. No. 2008-297123, which is incorporated herein by reference.

FIELD OF THE INVENTION

The present invention relates to thin film magnetic heads used in a magnetic disk drive, and particularly relates to thin film magnetic heads used for reproducing.

BACKGROUND OF THE INVENTION

As the recording density of hard disk drives (HDDs) becomes higher, generally, a thin film magnetic head that can be mounted in the HDD that has a reduced track size, a reduced gap, and increased sensitivity is beneficial. A combination of a recording head and a reproducing head is currently used as the thin film magnetic head. A giant magnetoresistive (GMR) head using a GMR effect was conventionally used as a previous reproducing head. The GMR head is a current-in-plane (CIP) type head in which a sense current is flowed into a sensor film in a direction parallel to a film plane. A tunneling magnetoresistive (TMR) head is used as a current reproducing head, which seems to be advantageous due to increases in output even if a track or gap is reduced, and is mainly used in order to improve recording density. Furthermore, a current perpendicular-to-the-plane (CPP)-GMR head, which is expected to be a next generation head following the TMR head, is now being actively developed. The TMR head and the CPP-GMR head are greatly different from the previous GMR head in that the sense current is flowed perpendicularly to the film plane.

In any type of head having the CPP structure, a sensor film is electrically connected to an upper magnetic-material shield via a nonmagnetic metal layer situated between the sensor film and the upper magnetic-material shield, as shown in Jap. Pat. Office (JPO) Pub. No. JP-A-2008-97700 or JPO Pub. No. JP-A-2003-204096. For example, Ta may be used for the nonmagnetic metal layer.

SUMMARY OF THE INVENTION

In a vertical-current-type reproducing magnetic head, according to one embodiment, an upper magnetic-material shield is disposed in such a configuration that a nonmagnetic adhesion layer does not exist on a sensor film, and exists on first insulating films and on domain-control magnetic films, or exists on the domain-control magnetic films. Alternatively, the upper magnetic-material shield may be disposed in such a configuration that the nonmagnetic adhesion layer does not exist on the sensor film, the first insulating films, and the domain-control magnetic films, and exists on third insulating films. According to another approach, the upper magnetic-material shield may be disposed in such a configuration that the nonmagnetic adhesion layer does not exist on the sensor film, and a first nonmagnetic adhesion layer exists on the first insulating films and the domain-control magnetic films, or exists on the domain-control magnetic films. Furthermore, a second nonmagnetic adhesion layer exists on the third insulating films. The nonmagnetic adhesion layer may be configured of a film of Cr, Ta, Ti and NiCr, or a film of an alloy or oxide thereof.

The vertical-current-type reproducing magnetic head, according to one approach, may be manufactured by a manufacturing method having a step of forming a track formation resist on a sensor film formed on a lower magnetic-material shield, a step of etching the sensor film with the track formation resist as a mask, a step of forming first insulating films, domain-control magnetic films, and nonmagnetic adhesion layers in a stacked manner while the track formation resist is left, a step of lifting-off the track formation resist, and a step of forming the upper magnetic-material shield.

Moreover, the vertical-current-type reproducing magnetic head, according to another approach, may be manufactured by a manufacturing method having a step of forming a track formation resist on a sensor film formed on a lower magnetic-material shield, a step of etching the sensor film with the track formation resist as a mask, a step of forming first insulating films and domain-control magnetic films in a stacked manner while the track formation resist is left, a step of lifting-off the track formation resist, a step of forming a third-insulating-film formation resist on the sensor film and on at least a region on a sensor film side of each of the domain-control magnetic films, a step of forming third insulating films and nonmagnetic adhesion layers in a stacked manner, a step of lifting-off the third-insulating-film formation resist, and a step of forming the upper magnetic-material shield. In the step of forming the first insulating films and the domain-control magnetic films in a stacked manner, the nonmagnetic adhesion layers may be further formed on the respective domain-control magnetic films in a stacked manner.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a vertical-current-type reproducing magnetic head comprises: a sensor film; an upper magnetic-material shield paired with a lower magnetic-material shield that together flow a current into the sensor film in a thickness direction of the sensor film; and magnetic-domain control magnetic films comprising first insulating films provided above both sides of the sensor film in a track width direction of the sensor film, wherein the upper magnetic-material shield is formed via a nonmagnetic adhesion layer, wherein the nonmagnetic adhesion layer includes a discontinuous region near the sensor film, and wherein the sensor film is contacted to the upper magnetic-material shield.

According to another general embodiment, a method of manufacturing a vertical-current-type reproducing magnetic head comprises: forming a track formation resist layer above a sensor film formed above a lower magnetic-material shield; etching the sensor film while using the track formation resist layer as a mask; forming first insulating films, domain-control magnetic films, and nonmagnetic adhesion layers in a stacked manner above both sides of the sensor film in a track width direction of the sensor film; lifting-off the track formation resist layer; and forming an upper magnetic-material shield paired with the lower magnetic-material shield that together flow current into the sensor film in a thickness direction of the sensor film.

According to yet another general embodiment, a method of manufacturing a vertical-current-type reproducing magnetic head comprises: forming a track formation resist layer above a sensor film formed above a lower magnetic-material shield; etching the sensor film using the track formation resist layer as a mask; forming first insulating films and domain-control magnetic films in a stacked manner above both sides of the sensor film in a track width direction of the sensor film; lifting-off the track formation resist layer; forming a third-insulating-film formation resist layer above the sensor film and above at least a region of a sensor film side of each of the domain-control magnetic films; forming third insulating films and nonmagnetic adhesion layers in a stacked manner above the sensor film; lifting-off the third-insulating-film formation resist layer; and forming an upper magnetic-material shield paired with the lower magnetic-material shield that together flow current into the sensor film in a thickness direction of the sensor film.

Several investigations into a structure of a reproducing head for a high-density magnetic disk have been made. CPP-GMR, TMR or a reproducing head for a high-density magnetic disk following the CPP-GMR structure should have low resistance, a high MR ratio, and a smaller shield interval. The shield interval refers to a distance between a top of a lower magnetic-material shield and a bottom of an upper magnetic-material shield in a sensor film portion. The shield interval may be reduced according to one embodiment, resulting in a signal magnetic field from a magnetic disk being detected with high resolution, and consequently high density recording can be performed.

In a flying surface configuration, as described in WO Pub. No. JP-A-2008-97700 or JPO Pub. No. JP-A-2003-204096, a prior art nonmagnetic adhesion layer lies on the whole surface of a sensor film and various film structures such as domain-control magnetic films disposed near respective ends of the sensor film, and an upper magnetic-material shield is formed on the surfaces via the nonmagnetic adhesion layer. The results in adhesion between the sensor film or the various film structures disposed near the ends of the sensor film, and securing of the upper magnetic-material shield. In addition, separation of the upper magnetic-material shield is prevented, and head properties are well maintained. However, in the prior art structure, since the nonmagnetic adhesion layer is additionally disposed between the sensor film and the upper magnetic-material shield, the shield interval is increased by a distance corresponding to thickness of the nonmagnetic adhesion layer. Moreover, since the nonmagnetic adhesion layer acts as a resistance component, electrical properties are degraded.

Furthermore, although the nonmagnetic adhesion layer hinders a decrease in resistance, an increase in MR ratio, and a reduction in shield interval in the prior art structure, the layer is indispensable since that separation hardly occurs between the sensor film and the upper magnetic-material shield.

According to one embodiment, since there is no nonmagnetic adhesion layer on the sensor film, compared with the prior art structure, the shield interval can be reduced by a distance corresponding to a thickness of the adhesion layer and thus resolution may be improved, resulting in improved recording density. Furthermore, since a resistance component of the nonmagnetic adhesion layer can be reduced, head resistance may be reduced, so that an MR ratio and signal-to-noise (S/N) ratio of a head can be improved. In addition, since separation of the upper magnetic-material shield can be prevented by a nonmagnetic adhesion layer provided on a film on an outer side with respect to each end of the sensor film, the upper magnetic-material shield can be stably disposed.

Hereinafter, one preferred embodiment is described. Typically, the reproducing head for a high-density magnetic disk may be used while being combined with a recording head. Since this embodiment is applied to a reproducing head, a recording head portion is omitted from the description, and only a reproducing head portion is described.

Figure 1:
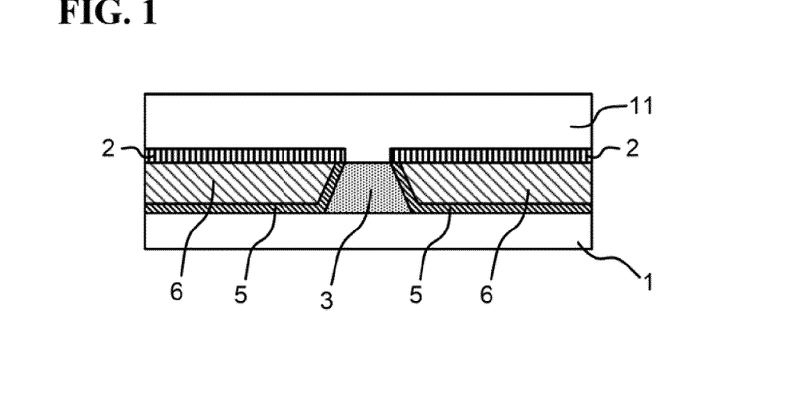
FIG. 1 is a view showing an example of a reproducing head for a high-density magnetic disk according to one embodiment.

FIG. 1 shows an example of a reproducing head for a high-density magnetic disk according to one embodiment, showing a flying surface configuration near a sensor film 3. In FIG. 1, a sensor film 3, a lower magnetic-material shield 1, first insulating films 5, magnetic-domain control magnetic films 6, nonmagnetic adhesion layers 2, and an upper magnetic-material shield 11 are shown. The sensor film 3 has a multilayer film having at least a free layer, a pinning layer, and an intermediate layer provided between the free layer and the pinning layer. Other detailed configuration of the sensor film is omitted.

In a structure of the head, according to one embodiment, the nonmagnetic adhesion layer 2 may not exist on the sensor film 3, and may exist on the first insulating films 5 and on the magnetic-domain control magnetic films 6. An upper surface of the sensor film 3 is contacted to the upper magnetic-material shield 11. In this structure of the present embodiment, since the nonmagnetic adhesion layer 2 does not exist on the sensor film 3, compared with a prior art structure, a shield interval can be reduced by a distance corresponding to a thickness of the adhesion layer and thus resolution is improved, and consequently recording density can be improved. Furthermore, since a resistance component of the nonmagnetic adhesion layer 2 can be reduced, head resistance may be reduced, so that an MR ratio and S/N ratio of the magnetic head can be improved. In addition, since separation of the upper magnetic-material shield 11 can be prevented by the nonmagnetic adhesion layer 2 provided on a film on an outer side with respect to each end of the sensor film 3, the upper magnetic-material shield 11 can be stably disposed without continuously forming the nonmagnetic adhesion layer 2 over an area from an upper surface of the sensor film to the periphery thereof.

Figure 2:
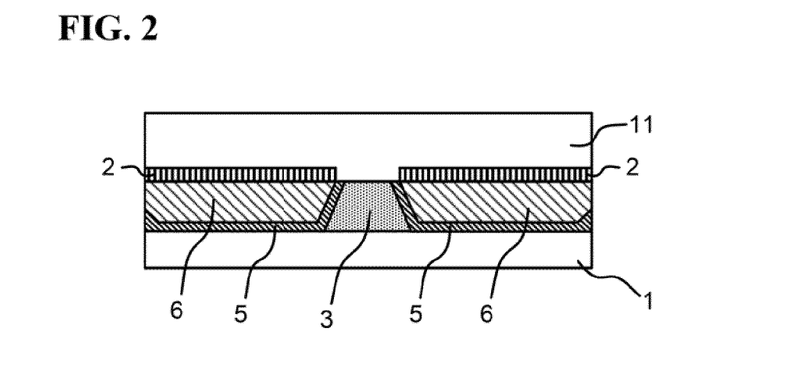
FIG. 2 is a view showing another example of the reproducing head for a high-density magnetic disk according to one embodiment.

FIG. 2 shows another example of the reproducing head for a high-density magnetic disk according to one embodiment. In a structure of this embodiment, the nonmagnetic adhesion layer 2 may not exist on the sensor film 3 and on the first insulating films 5, and exists on the magnetic-domain control magnetic films 6. An upper surface of the sensor film 3 and upper end faces on a sensor side of the first insulating films 5 are contacted to the upper magnetic-material shield 11. In this structure, compared with the structure of FIG. 1, a shield interval is reduced in each track end, thereby influence on an adjacent bit can be reduced, enabling improvement in resolution or the like.

Figure 3:
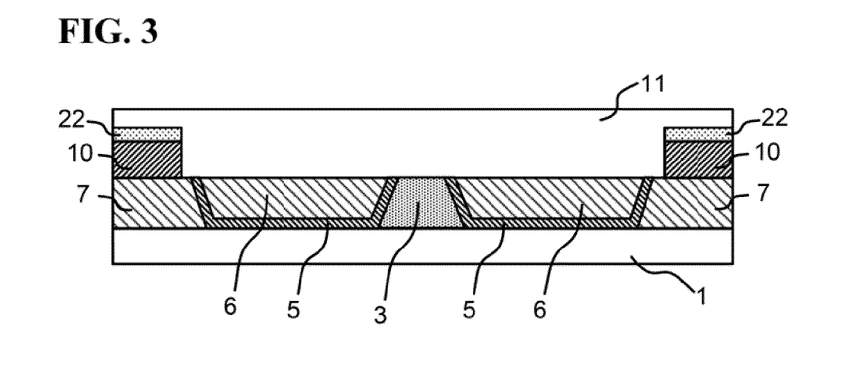
FIG. 3 is a view showing still another example of reproducing head for a high-density magnetic disk according to one embodiment.

FIG. 3 shows still another example of the reproducing head for a high-density magnetic disk according to one embodiment, showing third insulating films 10. Second insulating films 7 are formed on both outer sides in a track width direction with respect to the first insulating films 5, and the third insulating films 10 are formed on the respective second insulating films 7. In a structure according to one embodiment, the nonmagnetic adhesion layer 2 may not exist on the sensor film 3, the first insulating films 5, and the magnetic-domain control magnetic films 6, and a nonmagnetic adhesion layer 22 exists on the third insulating films 10. An upper surface of the sensor film 3, upper-surfaces of the magnetic-domain control magnetic films 6, and upper end faces of the first insulating films 5 are contacted to the upper magnetic-material shield 11. In this structure, compared with the structure of FIG. 1 or 2, a step of forming the nonmagnetic adhesion layers 2 may be omitted, consequently reduction in steps and reduction in cost may be correspondingly achieved.

Figure 4:
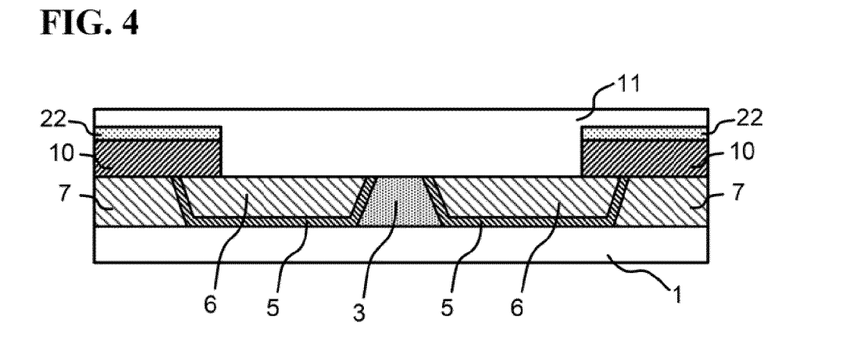
FIG. 4 is a view showing still another example of the reproducing head for a high-density magnetic disk according to one embodiment.

FIG. 4 shows still another example of the reproducing head for a high-density magnetic disk according to one embodiment, showing third insulating films 10. Second insulating films 7 are formed on both outer sides in a track width direction with respect to the first insulating films 5, and the third insulating films 10 are formed on part of the respective magnetic-domain control magnetic films 6 and on the respective second insulating films 7. In a structure of this embodiment, the nonmagnetic adhesion layer 2 does not exist on the sensor film 3, the first insulating films 5, and the magnetic-domain control magnetic films 6, and a nonmagnetic adhesion layer 22 exists on the third insulating films 10. An upper surface of the sensor film 3, upper surfaces in partial regions on a sensor side of the magnetic-domain control magnetic films 6, and upper end faces on a sensor side of the first insulating films S are contacted to the upper magnetic-material shield 11. In this structure, compared with the structure of FIG. 1 or 2, a step of forming the nonmagnetic adhesion layer 2 may be omitted, consequently reduction in steps and reduction in cost may be correspondingly achieved. The structure of the present embodiment corresponds to a structure of FIG. 3 in which a formation area of each third insulating film 10 is changed. Since each nonmagnetic adhesion layer 22 can be disposed near the sensor film compared with a mode of FIG. 3, adhesion of the upper magnetic-material shield 11 can be improved compared with the mode of FIG. 3.

Figure 5:
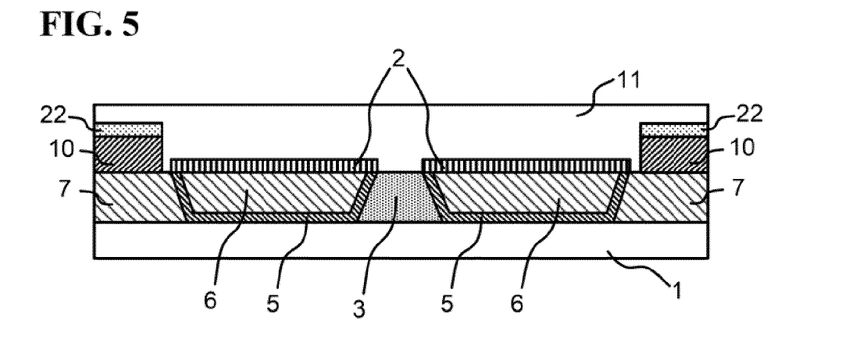
FIG. 5 is a view showing still another example of the reproducing head for a high-density magnetic disk according to one embodiment.

FIG. 5 shows still another example of the reproducing head for a high-density magnetic disk according to one embodiment. Second insulating films 7 are formed on both outer sides in a track width direction with respect to the first insulating films 5, and third insulating films 10 are formed on the respective second insulating films 7. In the example, a nonmagnetic adhesion layer includes the first nonmagnetic adhesion layer 2 and a second nonmagnetic adhesion layer 22. In a structure of the example, both of the nonmagnetic adhesion layers 2 and 22 do not exist on the sensor film 3, and the first nonmagnetic adhesion layer 2 exists on the first insulating films 5 and on the magnetic-domain control magnetic films 6, and the second nonmagnetic adhesion layer 22 exists on the third insulating films 10. An upper surface of the sensor film 3 is contacted to the upper magnetic-material shield 11. In the example, a step of forming the nonmagnetic adhesion layer 2 is added to formation steps of the structure of FIG. 3, so that adhesion of the upper magnetic-material shield 11 is improved.

Figure 6:
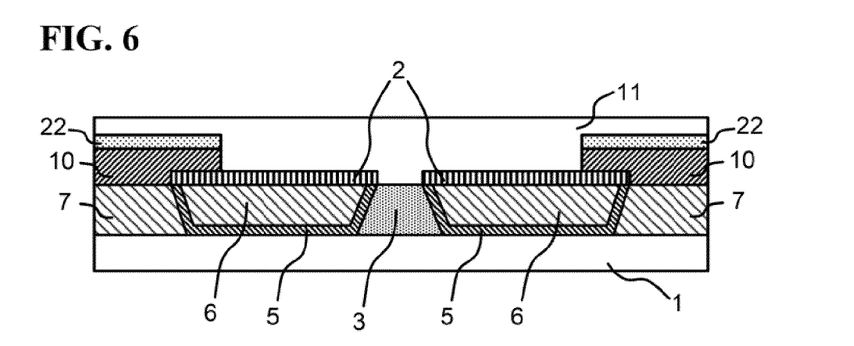
FIG. 6 is a view showing still another example of the reproducing head for a high-density magnetic disk according to one embodiment.

FIG. 6 shows still another example of the reproducing head for a high-density magnetic disk according to one embodiment. In the example, a nonmagnetic adhesion layer includes a first nonmagnetic adhesion layer 2 and a second nonmagnetic adhesion layer 22. In a structure of the example, both of the nonmagnetic adhesion layers 2 and 22 do not exist on the sensor film 3, and the first nonmagnetic adhesion layer 2 exists on the first insulating films 5 and on the magnetic-domain control magnetic films 6. Furthermore, each third insulating film 10 is continuously formed on part of an outer region in a track width direction of each first nonmagnetic adhesion layer 2 and on each second insulating film 7, and the second nonmagnetic adhesion layer 22 exists on each third insulating film 10. An upper surface of the sensor film 3 contacts the upper magnetic-material shield 11. The structure of the example corresponds to the structure of FIG. 5 in which a formation area of each third insulating film 10 is changed. The first nonmagnetic adhesion layer 2 or the second nonmagnetic adhesion layer 22 always exist on areas other than the upper surface of the sensor film 3, so that adhesion of the upper magnetic-material shield 11 is further improved.

Figure 7:
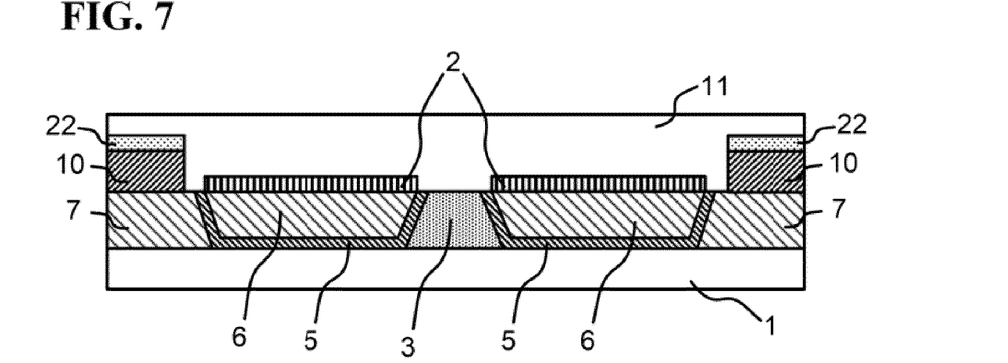
FIG. 7 is a view showing still another example of the reproducing head for a high-density magnetic disk according to one embodiment.

FIG. 7 shows still another example of the reproducing head for a high-density magnetic disk according to one embodiment. In the example, a nonmagnetic adhesion layer includes the first nonmagnetic adhesion layer 2 and a second nonmagnetic adhesion layer 22. In a structure of the example, both of the nonmagnetic adhesion layers 2 and 22 do not exist on the sensor film 3 and on the first insulating films 5, and the first nonmagnetic adhesion layer 2 exists on the magnetic-domain control magnetic films 6, and the second nonmagnetic adhesion layer 22 exists on the third insulating films 10. An upper surface of the sensor film 3 contacts the upper magnetic-material shield 11. In this structure, compared with the structure of FIG. 5, a shield interval is reduced in each track end, thereby influence on an adjacent bit can be reduced, leading to improvement in resolution. Furthermore, a step of forming the nonmagnetic adhesion layer 2 is added to improve adhesion.

Figure 8:
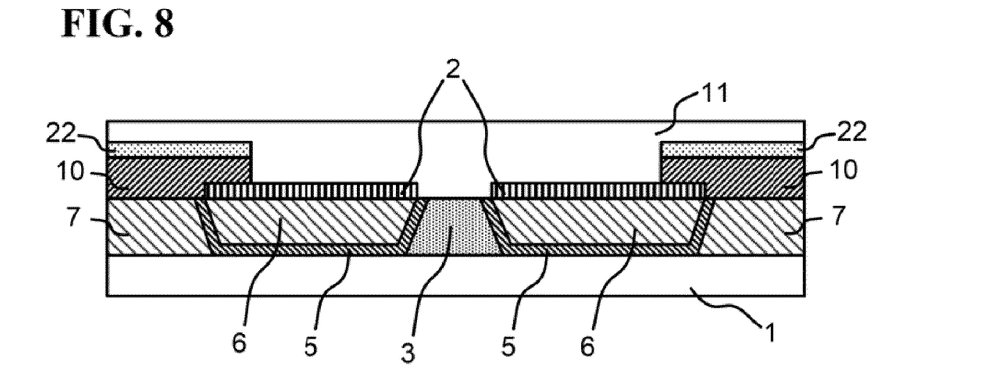
FIG. 8 is a view showing still another example of the reproducing head for a high-density magnetic disk according to one embodiment.

FIG. 8 shows still another example of the reproducing head for a high-density magnetic disk according to one embodiment. In the example, a nonmagnetic adhesion layer includes a first nonmagnetic adhesion layer 2 and a second nonmagnetic adhesion layer 22. In a structure of the example, both of the nonmagnetic adhesion layers 2 and 22 do not exist on the sensor film 3 and on the first insulating films 5, and the first nonmagnetic adhesion layer 2 exists on the magnetic-domain control magnetic films 6. Furthermore, each of the third insulating films 10 is continuously formed on part of an outer region in a track width direction of each first nonmagnetic adhesion layer 2, and on a still outer region thereof, and the second nonmagnetic adhesion layer 22 exists on each third insulating film 10. The structure of the example corresponds to the structure of FIG. 7 in which a formation area of each third insulating film 10 is changed. An upper surface of the sensor film 3 contacts the upper magnetic-material shield 11. The first nonmagnetic adhesion layer 2 or the second nonmagnetic adhesion layer 22 always exists on areas other than the upper surface of the sensor film 3 and upper end faces on a sensor side of the first insulating films 5, so that adhesion is further improved.

In any of the examples and embodiments, the first and second nonmagnetic adhesion layers 2 and 22 may be comprised of a film of Cr, Ta, Ti or NiCr, or a film of an alloy or oxide thereof.

Figure 9:
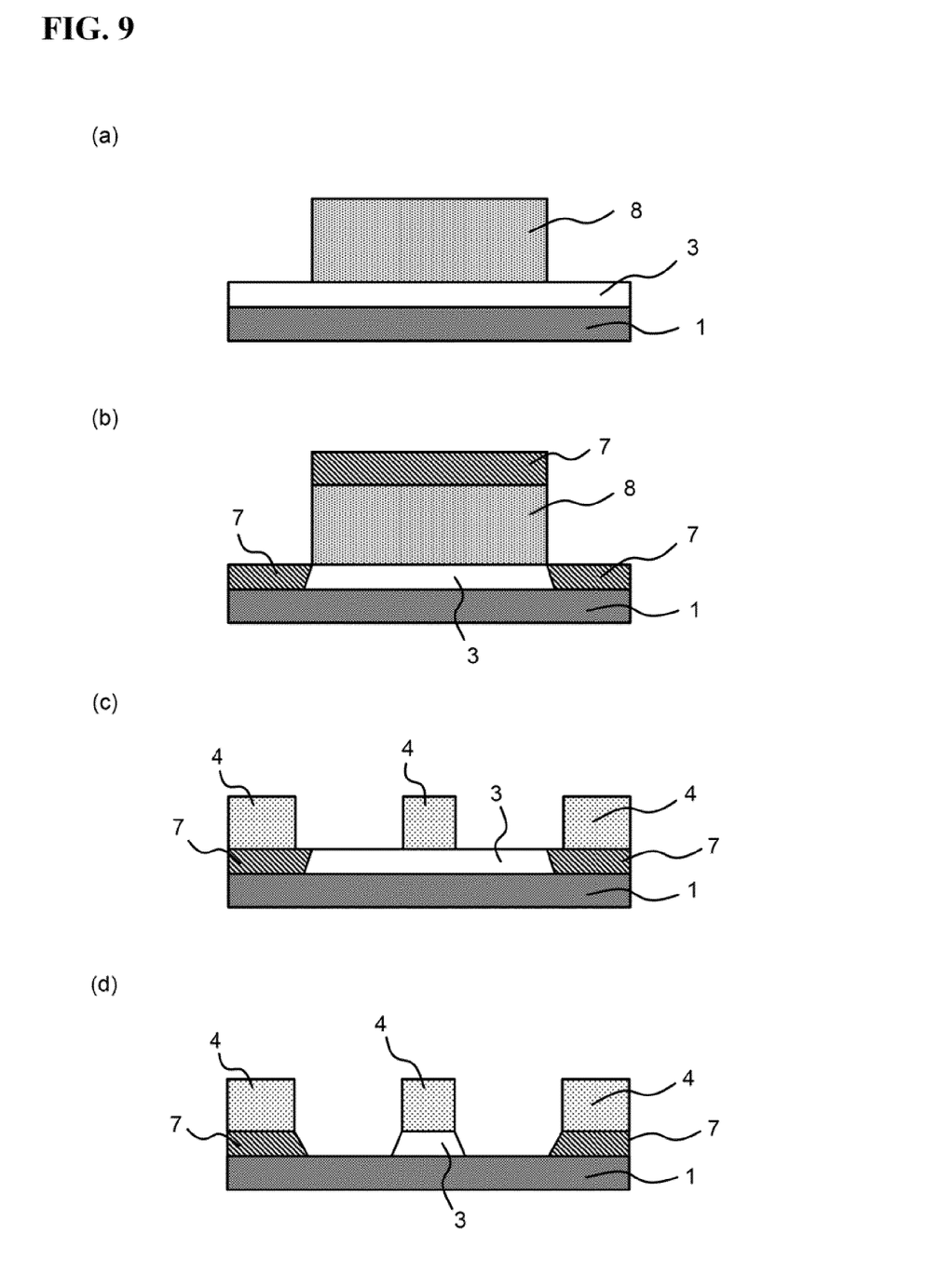
FIG. 9 is explanatory views of a process flow of the reproducing head for a high-density magnetic disk according to one embodiment.
Figure 10:
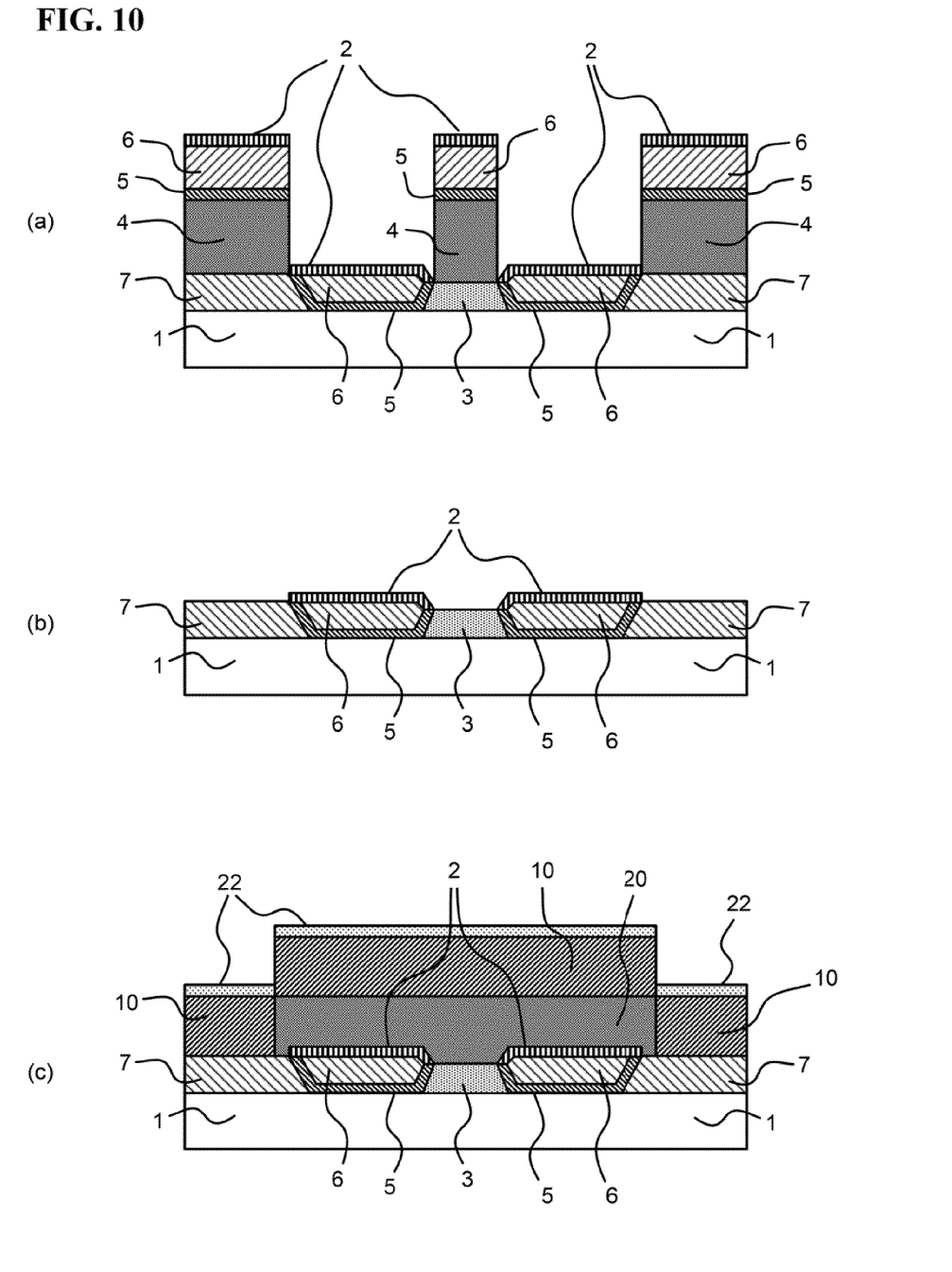
FIG. 10 is explanatory views of the process flow of the reproducing head for a high-density magnetic disk according to one embodiment.

In other approaches, methods of manufacturing a reproducing head for a high-density magnetic disk are described using FIGS. 9 and 10.

In FIG. 9(a), a sensor film 3, such as a TMR film, is formed on the lower magnetic-material shield 1. Then, an element-height formation resist 8 is formed. Any forming technique or method may be used as known to one of skill in the art.

In FIG. 9(b), the sensor film 3 is etched using the element-height formation resist 8 as an etching mask. Then, a second insulating film 7 is formed while the element-height formation resist 8 is left. While not shown, the element-height formation resist 8 is then lifted off so that the second insulating film 7 is disposed only on portions etched using the element-height formation resist 8. Any etching technique or method may be used as known to one of skill in the art.

In FIG. 9(c), a track formation resist 4 is formed. Any formation technique or method may be used as known to one of skill in the art.

In FIG. 9(d), the sensor film 3 and the second insulating film 7 are etched using the track formation resist 4 as an etching mask. Any etching technique or method may be used as known to one of skill in the art.

In FIG. 10(a), while the track formation resist 4 is left, first insulating films 5 for securing insulation of wall surfaces of the sensor, magnetic-domain control magnetic films 6, and nonmagnetic adhesion layers 2 are formed. Any forming technique or method may be used as known to one of skill in the art.

In FIG. 10(b), the track formation resist 4 is lifted off so that respective unnecessary portions of the first insulating films 5, the magnetic-domain control magnetic films 6, and the non-magnetic adhesion layers 2 are removed. Any lift-off technique or method may be used as known to one of skill in the art.

In FIG. 10(c), a third insulating-film-formation resist 20 is formed. Then, third insulating films 10 and second nonmagnetic adhesion layers 22 are formed. Any formation technique or method may be used as known to one of skill in the art.

In FIG. 10(d), the third insulating-film-formation resist 20 is lifted-off so that respective unnecessary portions of the third insulating films 10 and the second nonmagnetic adhesion layers 22 are removed. Any lift-off technique or method may be used as known to one of skill in the art.

In FIG. 10(e), an upper magnetic-material shield 11 is formed, using any formation technique known to one of skill in the art.

The above manufacturing method may be used, so that the structure of the reproducing head shown in FIG. 5 can be stably produced.

Next, another method of manufacturing the reproducing head for a high-density magnetic disk is described, according to one embodiment. Since steps from FIGS. 9(a) to 9(d) are common between the two embodiments, description of the steps is omitted, and only subsequent steps are described.

Figure 11:
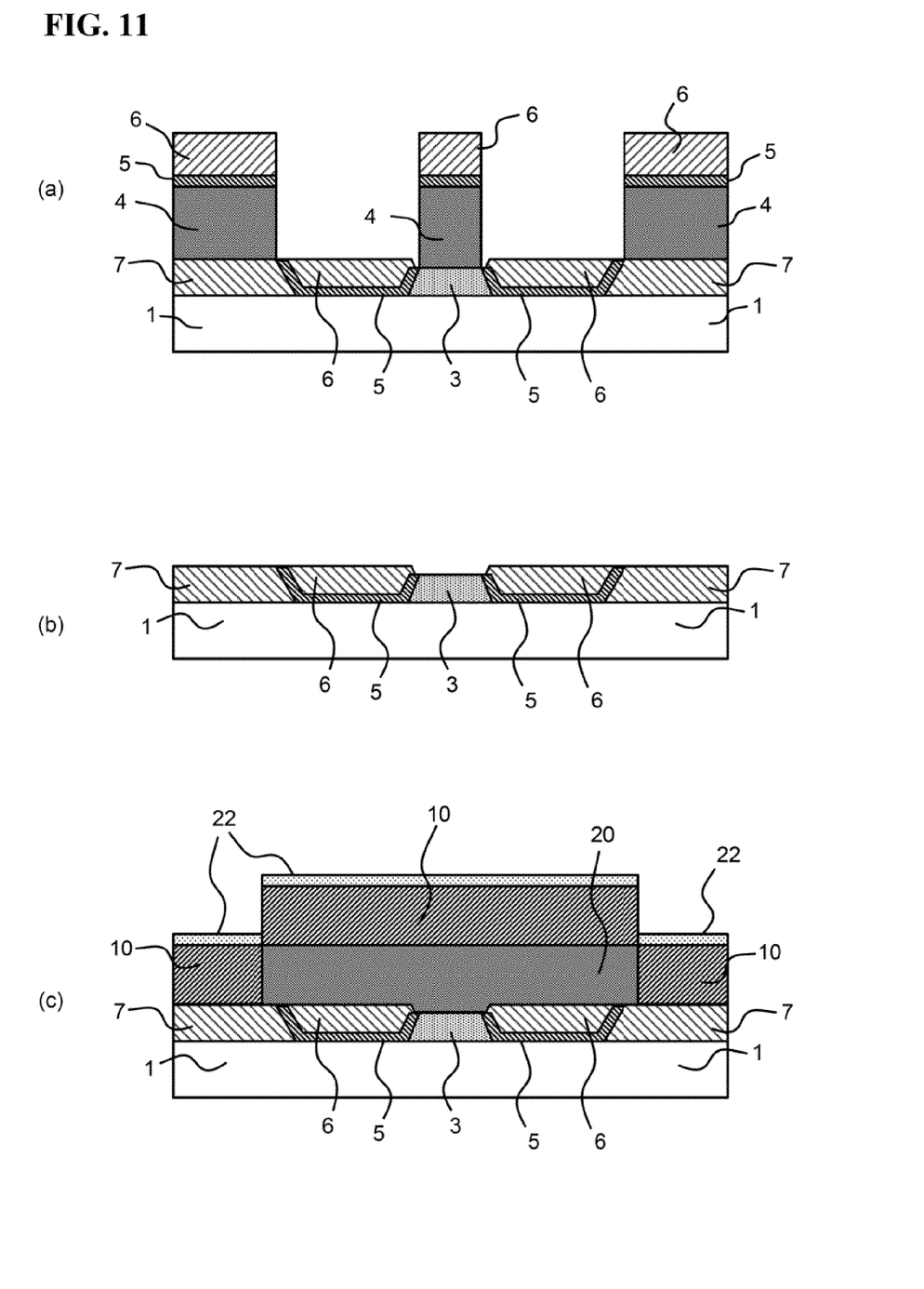
FIG. 11 is explanatory views of another process flow of the reproducing head for a high-density magnetic disk according to one embodiment.

In FIG. 11(a), while the track formation resist 4 is left, first insulating films 5 for securing insulation of wall surfaces of the sensor and magnetic-domain control magnetic films 6 are formed. Any formation technique or method may be used as known to one of skill in the art.

In FIG. 11(b), the track formation resist 4 is lifted-off so that respective unnecessary portions of the first insulating films 5 and the magnetic-domain control magnetic films 6 are removed. Any lift-off technique or method may be used as known to one of skill in the art.

In FIG. 11(c), a third insulating-film-formation resist 20 is formed. Then, third insulating films 10 and second nonmagnetic adhesion layers 22 are formed. Any formation technique or method may be used as known to one of skill in the art.

In FIG. 11(d), the third insulating-film-formation resist 20 is lifted-off so that respective unnecessary portions of the third insulating films 10 and the second nonmagnetic adhesion layers 22 are removed. Any lift-off technique or method may be used as known to one of skill in the art.

In FIG. 11(e), an upper magnetic-material shield 11 is formed. Any formation technique or method may be used as known to one of skill in the art.

The above manufacturing method may be used, according to one embodiment, so that the structure of the reproducing head shown in FIG. 3 can be stably produced.

Next, still another method of manufacturing the reproducing head for a high-density magnetic disk is described, according to one embodiment. Since steps from FIGS. 9(a) to 9(d) are common, description of the steps is omitted, and only subsequent steps are described.

In FIG. 12(a), while the track formation resist 4 is left, a first insulating film 5 is conformably formed for securing insulation of wall surfaces of the sensor, then magnetic-domain control magnetic films 6 are formed. Any formation technique or method may be used as known to one of skill in the art.

In FIG. 12(b), the track formation resist 4 is lifted-off so that respective unnecessary portions of the first insulating films 5 and the magnetic-domain control magnetic films 6 are removed. Any lift-off technique or method may be used as known to one of skill in the art.

In FIG. 12(c), a third insulating-film-formation resist 20 is formed. Then, third insulating films 10 and second nonmagnetic adhesion layers 22 are formed. Any formation technique or method may be used as known to one of skill in the art.

Figure 12:
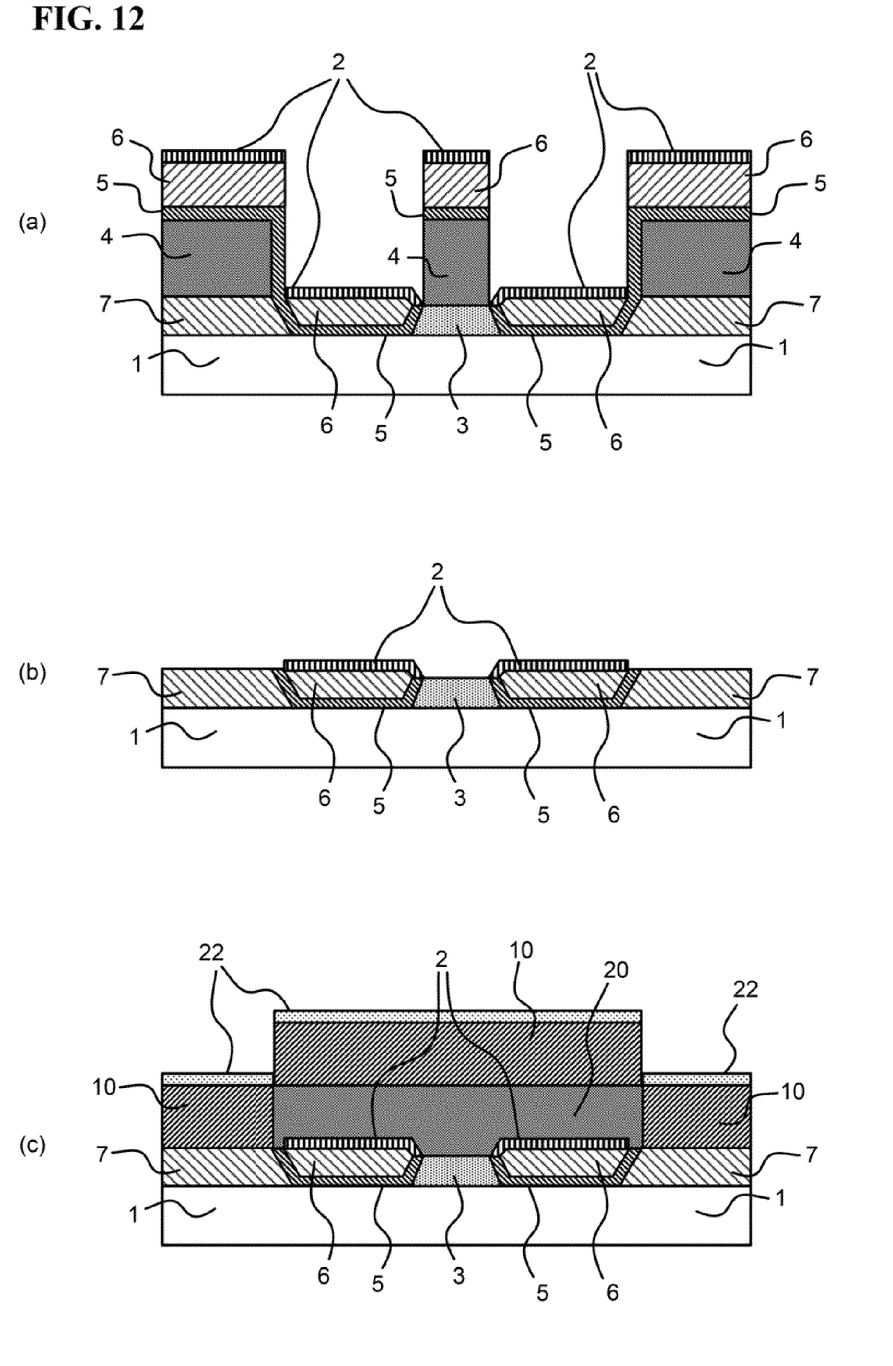
FIG. 12 is explanatory views of still another process flow of the reproducing head for a high-density magnetic disk according to one embodiment.

In FIG. 12(*d*), the third insulating-film-formation resist 20 is lifted-off so that respective unnecessary portions of the third insulating films 10 and the second nonmagnetic adhesion layers 22 are removed. Any lift-off technique or method may be used as known to one of skill in the art.

In FIG. 12(*e*), an upper magnetic-material shield 11 is formed. Any formation technique or method may be used as known to one of skill in the art.

The above manufacturing method may be used, according to one embodiment, so that the structure of the reproducing head shown in FIG. 7 can be stably produced.

Contents of the invention, according to several embodiments, have been specifically described using examples. Various modifications or alterations can be made based on the basic technical idea and the description of the several embodiments and examples provided herein.

For example, the structure of FIG. 8 is configured such that the nonmagnetic adhesion layer does not exist on the sensor film 3 and the first insulating films 5, and exists on the magnetic-domain control magnetic films 6 and the third insulating films 10. However, according to another approach, any structure may be used as long as the nonmagnetic adhesion layer is not disposed on the sensor film in the structure. That is, the structure of FIG. 8 may be combined with a structure where the nonmagnetic adhesion layer exists on the first insulating film 5.

While a configuration of the sensor film 3 has not been described in detail, the advantage of the structure, according to several embodiments, is similarly obtained in any device as long as a sense current is flowed in a direction perpendicularly to the sensor film 3 in the device.

The prior art structure has a sensor film, a pair of first insulating films formed on both sides of the sensor film, a pair of domain-control magnetic films still formed on both sides of the first insulating films, a pair of second insulating films still formed on both sides of the domain-control magnetic films, and third insulating films formed on the respective second insulating films, wherein an upper magnetic-material shield is disposed on these films via a nonmagnetic adhesion layer continuously formed over the films.

It should be noted that methodology presented herein for at least some of the various embodiments may be implemented, in whole or in part, in computer hardware, software, by hand, using specialty equipment, etc., and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A vertical-current-type reproducing magnetic head, comprising:
a sensor film;
an upper magnetic-material shield paired with a lower magnetic-material shield that together flow a current into the sensor film in a thickness direction of the sensor film; and
magnetic-domain control magnetic films comprising first insulating films provided above both sides of the sensor film in a track width direction of the sensor film;
wherein the upper magnetic-material shield is formed via a nonmagnetic adhesion layer
second insulating films provided outside both outer sides of the magnetic-domain control magnetic films with respect to the sensor film in a track width direction; and
third insulating films, each third insulating film being provided above a surface of each of the second insulating films or continuously provided over an area from a surface region on an outer side in a track width direction of each of the magnetic-domain control magnetic films to a surface of the second insulating film,
wherein the nonmagnetic adhesion layer is provided above the third insulating film.

2. The magnetic head according to claim 1, wherein the nonmagnetic adhesion layer is comprised of a film comprising at least one of: Cr, Ta, Ti, NiCr, an alloy thereof, and oxide thereof.

3. The magnetic head according to claim 1, wherein the nonmagnetic adhesion layer is provided above the magnetic-domain control magnetic films.

4. The magnetic head according to claim 3, wherein the nonmagnetic adhesion layer is comprised of a film comprising at least one of: Cr, Ta, Ti, NiCr, an alloy thereof, and oxide thereof.

5. A method of manufacturing the vertical-current-type reproducing magnetic head as recited in claim 1, the method comprising:
forming a track formation resist layer above a sensor film formed above a lower magnetic-material shield;
etching the sensor film while using the track formation resist layer as a mask;
forming first insulating films, domain-control magnetic films, and nonmagnetic adhesion layers in a stacked manner above both sides of the sensor film in a track width direction of the sensor film;
lifting-off the track formation resist layer; and
forming an upper magnetic-material shield paired with the lower magnetic-material shield that together flow current into the sensor film in a thickness direction of the sensor film.

6. A vertical-current-type reproducing magnetic head, comprising:
a sensor film;
an upper magnetic-material shield paired with a lower magnetic-material shield that together flow a current into the sensor film in a thickness direction of the sensor film; and
magnetic-domain control magnetic films comprising first insulating films provided above both sides of the sensor film in a track width direction of the sensor film,
wherein the upper magnetic-material shield is formed via a nonmagnetic adhesion layer that is positioned directly on the magnetic-domain control magnetic films,
wherein the nonmagnetic adhesion layer includes a discontinuous region near the sensor film, and
the sensor film contacts the upper magnetic-material shield;
second insulating films provided outside both outer sides of the magnetic-domain control magnetic films with respect to the sensor film in a track width direction; and
third insulating films, each third insulating film being provided above a surface of each of the second insulating films or continuously provided over an area from a surface region on an outer side in a track width direction of each of the magnetic-domain control magnetic films to a surface of the second insulating film,
wherein the nonmagnetic adhesion layer is provided above the third insulating film.

7. The magnetic head according to claim 6, wherein the nonmagnetic adhesion layer is comprised of a film comprising at least one of: Cr, Ta, Ti, NiCr, an alloy thereof, and oxide thereof.

8. A method of manufacturing the vertical-current-type reproducing magnetic head as recited in claim 6, the method comprising:
   forming a track formation resist layer above a sensor film formed above a lower magnetic-material shield;
   etching the sensor film using the track formation resist layer as a mask;
   forming first insulating films and domain-control magnetic films in a stacked manner above both sides of the sensor film in a track width direction of the sensor film;
   lifting-off the track formation resist layer;
   forming a third-insulating-film formation resist layer above the sensor film and above at least a region of a sensor film side of each of the domain-control magnetic films;
   forming third insulating films and nonmagnetic adhesion layers in a stacked manner above the sensor film;
   lifting-off the third-insulating-film formation resist layer; and
   forming an upper magnetic-material shield paired with the lower magnetic-material shield that together flow current into the sensor film in a thickness direction of the sensor film.

9. The method according to claim 8, further comprising:
   forming second insulating films above outer sides of the sensor film in a track width direction of the sensor film with respect to the magnetic-domain control magnetic films,
   wherein the third insulating films are formed above a surface of each of the second insulating films or continuously provided over an area from a surface region above an outer side in a track width direction of each of the magnetic-domain control magnetic films to a surface of the second insulating film.

10. The method according to claim 8, further comprising forming nonmagnetic adhesion layers above the domain-control magnetic films in a stacked manner.

11. A vertical-current-type reproducing magnetic head, comprising:
   a sensor film;
   an upper magnetic-material shield paired with a lower magnetic-material shield that together flow a current into the sensor film in a thickness direction of the sensor film; and
   magnetic-domain control magnetic films comprising first insulating films provided above both sides of the sensor film in a track width direction of the sensor film,
   wherein the upper magnetic-material shield is formed via a nonmagnetic adhesion layer that is positioned directly on the magnetic-domain control magnetic films,
   wherein the nonmagnetic adhesion layer includes a discontinuous region near the sensor film, and
   the sensor film contacts the upper magnetic-material shield;
   second insulating films provided above outer sides in a track width direction with respect to the magnetic-domain control magnetic films; and
   third insulating films, each third insulating film being provided above a surface of each of the second insulating films or continuously provided over an area from a surface region on an outer side in a track width direction of each of the magnetic-domain control magnetic films to a surface of the second insulating film,
   wherein the nonmagnetic adhesion layer includes a first nonmagnetic adhesion layer and a second nonmagnetic adhesion layer, and
   wherein the first nonmagnetic adhesion layer is provided above the magnetic-domain control magnetic films and the second nonmagnetic adhesion layer is provided above the third insulating films.

12. The magnetic head according to claim 11, wherein the nonmagnetic adhesion layer is comprised of a film comprising at least one of: Cr, Ta, Ti, NiCr, an alloy thereof, and oxide thereof.

13. A vertical-current-type reproducing magnetic head, comprising:
   a sensor film;
   an upper magnetic-material shield paired with a lower magnetic-material shield that together flow a current into the sensor film in a thickness direction of the sensor film; and
   magnetic-domain control magnetic films;
   first insulating films adjacent both sides of the sensor film in a track width direction of the sensor film,
   wherein each of the first insulating films has a cross-sectional shape comprising:
      a first portion extending in a track width direction below an associated one of the magnetic-domain control magnetic films;
      second and third portions extending from the first portion in directions along opposite sides of the associated magnetic-domain control magnetic film, wherein one of the sides of the associated magnetic-domain control magnetic film faces the sensor film;
   wherein the upper magnetic-material shield is formed on a nonmagnetic adhesion layer,
   second insulating films provided on both outer sides of the magnetic-domain control magnetic films in a track width direction; and
   third insulating films, each third insulating film being provided above a surface of each of the second insulating films or continuously provided over an area from a surface region on an outer side in a track width direction of each of the magnetic-domain control magnetic films to a surface of the second insulating film,
   wherein the sensor film contacts the upper magnetic-material shield.

14. A vertical-current-type reproducing magnetic head, comprising:
   a sensor film;
   an upper magnetic-material shield paired with a lower magnetic-material shield that together flow a current into the sensor film in a thickness direction of the sensor film; and
   magnetic-domain control magnetic films;
   first insulating films adjacent both sides of the sensor film in a track width direction of the sensor film,
   wherein each of the first insulating films has a cross-sectional shape comprising:
      a first portion extending in a track width direction below an associated one of the magnetic-domain control magnetic films;
      second and third portions extending from the first portion in directions along opposite sides of the associated magnetic-domain control magnetic film, wherein one of the sides of the associated magnetic-domain control magnetic film faces the sensor film;
   second insulating films provided on both outer sides of the magnetic-domain control magnetic films in a track width direction; and third insulating films, each third insulating film being provided above a surface of each of the second insulating films or continuously provided over an area from a surface region on an outer side in a track width direction of each of the magnetic-domain control magnetic films to a surface of the second insulating film, wherein the upper magnetic-material shield is formed on a nonmagnetic adhesion layer, wherein the nonmagnetic adhesion layer includes a discontinuous region near the sensor film, wherein the sensor film contacts the upper magnetic-material shield, and wherein the nonmagnetic adhesion layer is provided above the third insulating film.

15. The magnetic head according to claim 14, wherein the nonmagnetic adhesion layer is positioned directly on the magnetic-domain control magnetic films.

* * * * *

UNITED STATES PATENT AND TRADEMARK OFFICE
CERTIFICATE OF CORRECTION

| | | |
|---|---|---|
| PATENT NO. | : 8,270,123 B2 | Page 1 of 1 |
| APPLICATION NO. | : 12/615222 | |
| DATED | : September 18, 2012 | |
| INVENTOR(S) | : Akita et al. | |

It is certified that error appears in the above-identified patent and that said Letters Patent is hereby corrected as shown below:

In the specification:

col. 6, line 9 replace "S" with --5--

Signed and Sealed this
Eleventh Day of December, 2012

David J. Kappos
*Director of the United States Patent and Trademark Office*